US010845921B2

United States Patent
Alameh et al.

(10) Patent No.: US 10,845,921 B2
(45) Date of Patent: Nov. 24, 2020

(54) METHODS AND SYSTEMS FOR AUGMENTING IMAGES IN AN ELECTRONIC DEVICE

(71) Applicant: Motorola Mobility LLC, Chicago, IL (US)

(72) Inventors: Rachid Alameh, Crystal Lake, IL (US); Thomas Merrell, Beach Park, IL (US)

(73) Assignee: Motorola Mobility LLC, Chicago, IL (US)

(*) Notice: Subject to any disclaimer, the term of this patent is extended or adjusted under 35 U.S.C. 154(b) by 262 days.

(21) Appl. No.: 15/985,244

(22) Filed: May 21, 2018

(65) Prior Publication Data

US 2019/0354235 A1 Nov. 21, 2019

(51) Int. Cl.
*G06F 3/042* (2006.01)
*G06K 9/00* (2006.01)

(52) U.S. Cl.
CPC ....... *G06F 3/0425* (2013.01); *G06K 9/00288* (2013.01); *G06K 9/00302* (2013.01); *G06K 9/00671* (2013.01); *G06K 9/00778* (2013.01)

(58) Field of Classification Search
CPC ...... G06F 3/0425; G06F 3/011; G06F 1/1694; G06F 3/0304; G06K 9/00288; G06K 9/00302; G06K 9/00671; G06K 9/00778; H04M 2250/52; H04M 2250/12; H04M 1/72522
See application file for complete search history.

(56) References Cited

U.S. PATENT DOCUMENTS

| | | | |
|---|---|---|---|
| 7,690,081 B2 | 4/2010 | Chern | |
| 8,264,599 B2 | 9/2012 | Lin | |
| 8,356,907 B2 | 1/2013 | Chan et al. | |
| 8,438,590 B2 * | 5/2013 | Crenshaw | H04H 60/33 725/10 |
| 9,791,975 B2 | 10/2017 | Sharma | |
| 2006/0232610 A1 | 10/2006 | Lee et al. | |
| 2006/0234784 A1 | 10/2006 | Reinhorn | |
| 2009/0046035 A1 | 2/2009 | Wen | |
| 2009/0322967 A1 | 12/2009 | Liou et al. | |
| 2010/0103332 A1 | 4/2010 | Li et al. | |
| 2010/0156818 A1 | 6/2010 | Burrough et al. | |
| 2010/0309442 A1 | 12/2010 | Sadhu | |
| 2012/0052908 A1 | 3/2012 | Kao et al. | |
| 2012/0227006 A1 | 9/2012 | Amm | |

(Continued)

OTHER PUBLICATIONS

Azongha, Sardis F., "Final Office Action", U.S. Appl. No. 15/244,918, filed Aug. 23, 2016; dated Aug. 14, 2018.

(Continued)

*Primary Examiner* — Yon J Couso
(74) *Attorney, Agent, or Firm* — Philip H. Burrus, IV

(57) ABSTRACT

An electronic device includes a user interface. The user interface can receive a single command to capture an image. An imager of the electronic device can capture at least the image in response to the single command to capture the image. One or more sensors of the electronic device can determine contextual input from an environment of the electronic device while the imager captures the image. One or more processors of the electronic device can then augment the image with a visible representation of the contextual input to create a single, still, augmented image.

20 Claims, 6 Drawing Sheets

(56) References Cited

U.S. PATENT DOCUMENTS

| | | |
|---|---|---|
| 2013/0314380 A1 | 11/2013 | Kuribayashi |
| 2015/0002734 A1 | 1/2015 | Lee |
| 2016/0316185 A1 | 10/2016 | Weber et al. |
| 2017/0006267 A1 | 1/2017 | Lim et al. |
| 2017/0289341 A1* | 10/2017 | Rodriguez .......... G06F 3/04842 |
| 2018/0059789 A1 | 3/2018 | Debates et al. |
| 2018/0075575 A1* | 3/2018 | Bostick .............. G06K 9/00604 |
| 2018/0293771 A1* | 10/2018 | Piemonte ............. G06Q 20/123 |
| 2018/0350144 A1* | 12/2018 | Rathod ................ H04W 4/029 |
| 2019/0114021 A1* | 4/2019 | Oliver .................. G06F 3/0418 |

OTHER PUBLICATIONS

"Current Technology Description", SMART-CAST Technology and One Computing Technology Description; Provided by Inventor on or before Jul. 5, 2016; Unknown original publication.

Azongha, Sardis, "NonFinal OA", U.S. Appl. No. 15/244,918, filed Aug. 23, 2016; dated Feb. 21, 2018.

* cited by examiner

METHODS AND SYSTEMS FOR AUGMENTING IMAGES IN AN ELECTRONIC DEVICE

BACKGROUND

Technical Field

This disclosure relates generally to electronic devices, and more particularly to electronic devices with imagers.

Background Art

Portable electronic devices, including smartphones, tablet computers, and the like, are used by millions of people. The owners of these devices use them to communicate with others, whether via voice communications or text or multimedia communications, as well as for managing their everyday lives.

Most of these electronic devices include an image capture device. The inclusion of image capture devices has become so ubiquitous on electronic devices that many people no longer own a separate camera. Instead, they snap images with the imager in their smartphone or other portable electronic communication device. The fact that the device includes wireless communication capabilities allows these users to share images with others via electronic mail or text communications. While conventional imagers in conventional portable electronic communication devices work well for capturing still images and communicating them electronically, it would be advantageous to have an improved device offering additional features.

Figure 1:
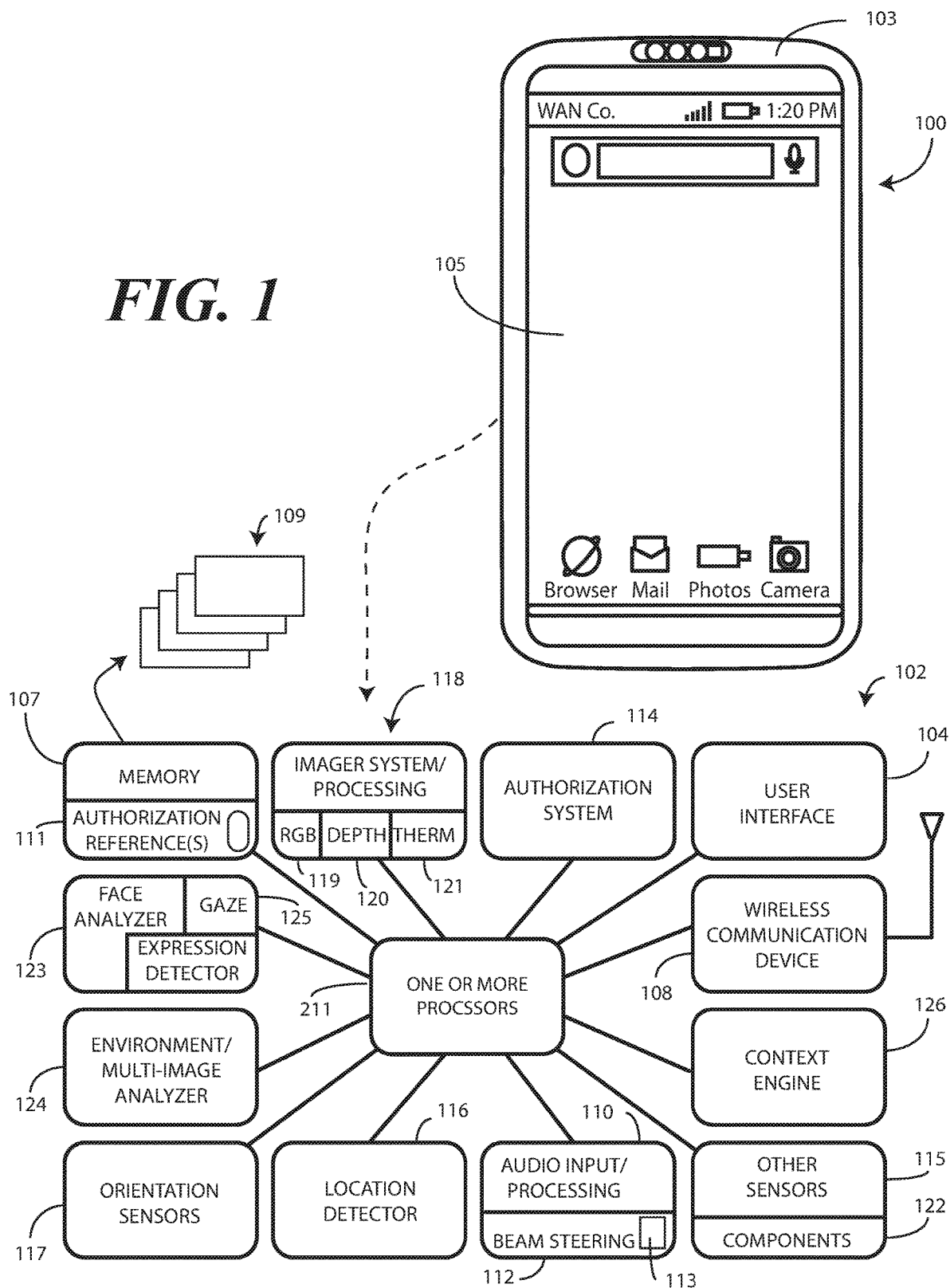
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to augmenting images, and in particular augmenting single still images in many embodiments. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of augmenting images with visible representations of information captured by an electronic device during the capture of the images, as described herein. The non-processor circuits may include, but are not limited to, a radio receiver, a radio transmitter, signal drivers, clock circuits, power source circuits, and user input devices. As such, these functions may be interpreted as steps of a method to perform augmenting images with a visible representation of contextual input received by one or more sensors during the capture of the image. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a, " "an, " and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device, and corresponding methods, for augmenting images captured by the electronic device with a visible representation of information received, and identified, by one or more processors of the electronic device and/or one or more sensors while the image is captured. The visible representations can be names of objects, subjects of the images, locations where the images are taken, landmarks in the image, and so forth. In other embodiments, the visible representations can be visible representations of audio, e.g., transcriptions, received while the images are being captured. In still other embodiments, the visible representations can be of voices of the subjects, laughter, spoken words, emotions of the subjects, and so forth. These examples are illustrative only, and are not intended to be comprehensive.

In one or more embodiments, a method in an electronic device includes receiving, with a user interface of the electronic device, a single command to capture an image. In one embodiment, the image is a single still image. Thus, in one embodiment, a user delivers a single command, e.g., a single button press or single touch of a user actuation target presented on a display, to capture an image. In one embodiment, the user delivers a single command to the user interface to capture a single still image.

In one or more embodiments, in response to this single command to capture an image, the electronic device captures, with an imager of the electronic device, at least the image. For example, in response to a single command to capture a single still image, the electronic device captures, with an imager of the electronic device, at least the single still image.

However, concurrently with capturing the image, in one or more embodiments the electronic device also captures additional information. Illustrating by example, in one embodiment in addition to capturing the single still image, the electronic device captures two additional images. In another embodiment, in addition to capturing the single still image, the electronic device captures a short video segment. In still another embodiments, in addition to capturing the single still image, an audio input device captures a predetermined amount of audio input, such as a few seconds, from an environment about the electronic device. Other examples of the additional information that can be received and captured while capturing the image will be described below. Still other examples will be obvious to those of ordinary skill in the art having the benefit of this disclosure.

In one or more embodiments, one or more processors of the electronic device then augment the image captured in response to the single command to capture the image with visible representations identifying the additional information that was received and captured while capturing the image. For instance, where the additional information comprises audio input received by an audio input device, the one or more processors can augment the image by overlaying a transcription of some—or all—of the audio input along the single still image.

Advantageously, embodiments of the disclosure passively "tag," by augmentation, captured images with visible representations of identified additional information received while the image was being captured. In one or more embodiments, this occurs in response to a single "shutter click" operation of the imager. Accordingly, from the user's perspective, it appears that the user has merely caused the device to capture a single still image. However, in the background the one or more processors of the electronic device have passively captured and identified additional information, which is passively tagged to the image as a visibly perceptible overlay constituting a visible representation of the additional information.

Illustrating this advantageous feature by example, in one or more embodiments the electronic device receives a single command to capture a single still image. When this occurs, in one or more embodiments the one or more processors instead capture three images. While capturing the three images, an audio input device, such as a microphone, captures corresponding audio from an environment about the electronic device. This audio, captured during the capture of the three images, can then be synthesized together to create a predetermined amount of audio input captured from the environment of the electronic device.

The one or more processors of the electronic device can then perform analysis operations on the content of both the images and the audio. For example, in one or more embodiments, the one or more processors can perform analysis operations on the images to mark and/or identify all objects and subjects in the image that can be identified. This can include objects, names, faces, and landmarks depicted in the images. The one or more processors can further analyze the predetermined amount of audio content to transcribe words, voices, and other identifiable sounds, as well as identify to whom each voice or sound belongs. In one or more embodiments some—or all—of the transcribed audio can be augmented to the image as a visibly perceptible overlay.

In one or more embodiments, the one or more processors can further augment the image with visible representations of contextual input received by one or more sensors while the imager captures the image in response to the user input receiving a single command to capture the image. Illustrating by example, the one or more processors can perform analysis operations on captured content to determine the emotions of subjects of the image, e.g., whether they are quiet, happy, sad, laughing, angry, soft, loud, agitated, and so forth. In one or more embodiments, the one or more processors can then augment the image with a visible representation of these emotions. For instance, the one or more processors may place an "emoji," which is a small digital image or icon used to express an idea or emotion, next to each subject.

Advantageously, to the user it appears as if a single still image has been captured. However, the rendering of that image can be full of additional information. The one or more processors can perform object recognition operations to augment the image with a visible representation of who is in the image, what is in the image, or where the image is taken, for example Visible representations of sounds, such as sound bites from subjects of the images, can be augmented to the image. Where the visible representations of the sounds are too lengthy for convenient visible representation augmentation, or is unintelligible, some speech or sounds can be concatenated into, or represented by, socially understood abbreviations, such as "LOL, " which means that a subject is laughing out loud. Where music is playing when the image is captured, the name of the song can be augmented to the image.

Embodiments of the disclosure provide the user with a richer contextual experience than simply capturing visible images. Moreover, via the augmentation of images and the corresponding visible representations, embodiments of the disclosure allow for easier searching of images as well. Other advantages will be described below. Still others will be obvious to those of ordinary skill in the art having the benefit of this disclosure.

Turning now to FIG. 1, illustrated therein is one explanatory electronic device 100 in accordance with one or more embodiments of the disclosure. Also illustrated in FIG. 1 is one explanatory block diagram schematic 102 of the explanatory electronic device 100 of FIG. 1. In one or more embodiments, the block diagram schematic 102 is configured as a printed circuit board assembly disposed within a housing 103 of the electronic device 100. Various components can be electrically coupled together by conductors or a bus disposed along one or more printed circuit boards.

The illustrative block diagram schematic 102 of FIG. 1 includes many different components. Embodiments of the disclosure contemplate that the number and arrangement of such components can change depending on the particular application. Accordingly, electronic devices configured in accordance with embodiments of the disclosure can include some components that are not shown in FIG. 1, and other components that are shown may not be needed and can therefore be omitted.

The illustrative block diagram schematic 102 includes a user interface 104. In one or more embodiments, the user interface 104 includes a display 105, which may optionally be touch-sensitive. In one embodiment, users can deliver user input to the display 105 of such an embodiment by delivering touch input from a finger, stylus, or other objects disposed proximately with the display 105. In one embodiment, the display 105 is configured as an active matrix organic light emitting diode (AMOLED) display. However, it should be noted that other types of displays, including liquid crystal displays, suitable for use with the user interface 104 would be obvious to those of ordinary skill in the art having the benefit of this disclosure.

In one embodiment, the electronic device includes one or more processors 106. In one embodiment, the one or more processors 106 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 102. Each of the application processor and the auxiliary processor(s) can be configured to process and execute executable software code to perform the various functions of the electronic device with which the block diagram schematic 102 operates. A storage device, such as memory 107, can optionally store the executable software code used by the one or more processors 106 during operation.

In this illustrative embodiment, the block diagram schematic 102 also includes a communication circuit 108 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The communication circuit 108 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 108 can include wireless communication circuitry, one of a receiver, a transmitter, or transceiver, and one or more antennas.

In one embodiment, the one or more processors 106 can be responsible for performing the primary functions of the electronic device with which the block diagram schematic 102 is operational. For example, in one embodiment the one or more processors 106 comprise one or more circuits operable with the user interface 104 to present presentation information to a user. The executable software code used by the one or more processors 106 can be configured as one or more modules 109 that are operable with the one or more processors 106. Such modules 109 can store instructions, control algorithms, and so forth.

In one or more embodiments, the block diagram schematic 102 includes an audio input/processor 110. The audio input/processor 110 is operable to receive audio input from an environment about the electronic device 100. The audio input/processor 110 can include hardware, executable code, and speech monitor executable code in one embodiment. The audio input/processor 110 can be operable with one or more predefined authentication references 111 stored in memory 107.

With reference to audio input, the predefined authentication references 111 can comprise representations of basic speech models, representations of trained speech models, or other representations of predefined audio sequences that are used by the audio input/processor 110 to receive and identify voice commands that are received with audio input captured by an audio capture device. In one embodiment, the audio input/processor 110 can include a voice recognition engine. Regardless of the specific implementation utilized in the various embodiments, the audio input/processor 110 can access various speech models stored with the predefined authentication references 111 to identify speech commands.

The audio input/processor 110 can include a beam steering engine 112 comprising one or more microphones 113. Input from the one or more microphones 113 can be processed in the beam steering engine 112 such that the one or more microphones define a virtual microphone. This virtual microphone can define an acoustic reception cone that can be virtually "steered" around the electronic device 100. Alternatively, actual steering can occur as well, such as switching between a left and right microphone or a front and back microphone, or switching various microphones ON and OFF individually. In one or more embodiments, two or more microphones 113 can be included for selective beam steering by the beam steering engine 112.

Illustrating by example, a first microphone can be located on a first side of the electronic device 100 for receiving audio input from a first direction, while a second microphone can be placed on a second side of the electronic device 100 for receiving audio input from a second direction. These microphones can be "steered" by selectively turning them ON and OFF.

The beam steering engine 112 can then select between the first microphone and the second microphone to beam steer audio reception toward an object, such as a user delivering audio input. This beam steering can be responsive to input from other sensors, such as imagers, facial depth scanners, thermal sensors, or other sensors. For example, an imager can estimate a location of a person's face and deliver signals to the beam steering engine 112 alerting it in which direction to focus the acoustic reception cone and/or steer the first microphone and the second microphone, thereby adding confirmation to audio steering and saving time. Where multiple people are around the electronic device 100, as was the case in FIG. 1, this steering advantageously directs a beam reception cone to the authorized user.

Alternatively, the beam steering engine 112 processes and combines the signals from two or more microphones to perform beam steering. The one or more microphones 113 can be used for voice commands. In response to control of the one or more microphones 113 by the beam steering engine 112, a user location direction can be determined. The beam steering engine 112 can then select between the first microphone and the second microphone to beam steer audio reception toward the user. Alternatively, the audio input/processor 110 can employ a weighted combination of the microphones to beam steer audio reception toward the user.

In one embodiment, the audio input/processor 110 is configured to implement a voice control feature that allows a user to speak a specific device command to cause the one or more processors 106 to execute a control operation. For example, the user may say, "Authenticate Me Now." This statement comprises a device command requesting the one or more processors to cooperate with the authentication system 114 to authenticate a user. Consequently, this device command can cause the one or more processors 106 to access the authentication system 114 and begin the authentication process. In short, in one embodiment the audio input/processor 110 listens for voice commands, processes the commands and, in conjunction with the one or more processors 106, performs a touchless authentication procedure in response to voice input.

The one or more processors 106 can perform filtering operations on audio input received by the audio input/processor 110. For example, in one embodiment the one or more processors 106 can filter the audio input into authorized user generated audio input, i.e., first audio input, and other audio input, i.e., second audio input.

Various sensors 115 can be operable with the one or more processors 106. A first example of a sensor that can be included with the various sensors 115 is a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 106, to detect an object in close proximity with—or touching—the surface of the display 105 or the housing 103 of the electronic device 100 by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

Another example of a sensor 115 is a geo-locator that serves as a location detector 116. In one embodiment, location detector 116 is able to determine location data when authenticating a user. Location can be determined by capturing the location data from a constellation of one or more earth orbiting satellites, or from a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. The satellite positioning systems based location fixes of the location detector 116 autonomously or with assistance from terrestrial base stations, for example those associated with a cellular communication network or other ground based network, or as part of a Differential Global Positioning System (DGPS), as is well known by those having ordinary skill in the art. The location detector 116 may also be able to determine location by locating or triangulating terrestrial base stations of a traditional cellular network, such as a CDMA network or GSM network, or from other local area networks, such as Wi-Fi networks.

One or more motion detectors can be configured as an orientation detector 117 that determines an orientation and/or movement of the electronic device 100 in three-dimensional space. Illustrating by example, the orientation detector 117 can include an accelerometer, gyroscopes, or other device to detect device orientation and/or motion of the electronic device 100. Using an accelerometer as an example, an accelerometer can be included to detect motion of the electronic device. Additionally, the accelerometer can be used to sense some of the gestures of the user, such as one talking with their hands, running, or walking.

The orientation detector 117 can determine the spatial orientation of an electronic device 100 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 100.

The authentication system 114 is operable with the one or more processors 106. A first authenticator 118 of the authentication system 114 can include an imager 119, a depth imager 120, and, optionally, a thermal sensor 121. In one embodiment, the imager 119 comprises a two-dimensional imager configured to receive at least one image of a person within an environment of the electronic device 100. In one embodiment, the imager 119 comprises a two-dimensional Red-Green-Blue (RGB) imager. In another embodiment, the imager 119 comprises an infrared imager. Other types of imagers suitable for use as the imager 119 of the authentication system will be obvious to those of ordinary skill in the art having the benefit of this disclosure.

The thermal sensor 121 can also take various forms. In one embodiment, the thermal sensor 121 is simply a proximity sensor component included with the other components 122 of the electronic device 100. In another embodiment, the thermal sensor 121 comprises a simple thermopile. In another embodiment, the thermal sensor 121 comprises an infrared imager that captures the amount of thermal energy emitted by an object. Other types of thermal sensors 121 will be obvious to those of ordinary skill in the art having the benefit of this disclosure.

The depth imager 120 can take a variety of forms. In a first embodiment, the depth imager 120 comprises a pair of imagers separated by a predetermined distance, such as three to four images. This "stereo" imager works in the same way the human eyes do in that it captures images from two different angles and reconciles the two to determine distance.

In another embodiment, the depth imager 120 employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment, the depth imager 120 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Regardless of embodiment, the depth imager 304, 305, 306 adds a third "z-dimension" to the x-dimension and y-dimension defining the two-dimensional image captured by the imager 119, thereby enhancing the security of using a person's face as their password in the process of authentication by facial recognition.

In one or more embodiments, the authentication system 114 can be operable with a face analyzer 123 and an environmental analyzer 124. The face analyzer 123 and/or environmental analyzer 124 can be configured to process an image or depth scan of an object and determine whether the object matches predetermined criteria by comparing the image or depth scan to one or more predefined authentication references 111 stored in memory 107.

For example, the face analyzer 123 and/or environmental analyzer 124 can operate as an authentication module configured with optical and/or spatial recognition to identify objects using image recognition, character recognition, visible recognition, facial recognition, color recognition, shape recognition, and the like. Advantageously, the face analyzer 123 and/or environmental analyzer 124, operating in tandem with the authentication system 114, can be used as a facial recognition device to determine the identity of one or more persons detected about the electronic device 100.

In one embodiment when the authentication system 114 detects a person, one or both of the imager 119 and/or the depth imager 120 can capture a photograph and/or depth scan of that person. The authentication system 114 can then compare the image and/or depth scan to one or more predefined authentication references 111 stored in the memory 107. This comparison, in one or more embodiments, is used to confirm beyond a threshold authenticity probability that the person's face—both in the image and the depth scan—sufficiently matches one or more of the predefined authentication references 111 stored in the memory 107 to authenticate a person as an authorized user of the electronic device 100.

Beneficially, this optical recognition performed by the authentication system 114 operating in conjunction with the face analyzer 123 and/or environmental analyzer 124 allows access to the electronic device 100 only when one of the persons detected about the electronic device 100 are sufficiently identified as an authorized user of the electronic device 100. Accordingly, in one or more embodiments the one or more processors 106, working with the authentication system 114 and the face analyzer 123 and/or environmental analyzer 124 can determine whether at least one image captured by the imager 119 matches a first predefined criterion, whether at least one facial depth scan captured by the depth imager 120 matches a second predefined criterion, and whether the thermal energy identified by the thermal sensor 121 matches a third predefined criterion, with the first criterion, second criterion, and third criterion being defined by the reference files and predefined temperature range. The first criterion may be a skin color, eye color, and hair color, while the second criterion is a predefined facial shape, ear size, and nose size. The third criterion may be a temperature range of between 95 and 101 degrees Fahrenheit. In one or more embodiments, the one or more processors 106 authenticate a person as an authorized user of the electronic device 100 when the at least one image matches the first predefined criterion, the at least one facial depth scan matches the second predefined criterion, and the thermal energy matches the third predefined criterion.

In one or more embodiments, a user can "train" the electronic device 100 by storing predefined authentication references 111 in the memory 107 of the electronic device 100. Illustrating by example, a user may take a series of pictures. They can include identifiers of special features such as eye color, sink color, air color, weight, and height. They can include the user standing in front of a particular wall, which is identifiable by the environmental analyzer from images captured by the imager 119. They can include the user raising a hand, touching hair, or looking in one direction, such as in a profile view. These can then be stored as predefined authentication references 111 in the memory 107 of the electronic device 100.

A gaze detector 125 can be operable with the authentication system 114 operating in conjunction with the face analyzer 123. The gaze detector 125 can comprise sensors for detecting the user's gaze point. The gaze detector 125 can optionally include sensors for detecting the alignment of a user's head in three-dimensional space. Electronic signals can then be processed for computing the direction of user's gaze in three-dimensional space. The gaze detector 125 can further be configured to detect a gaze cone corresponding to the detected gaze direction, which is a field of view within which the user may easily see without diverting their eyes or head from the detected gaze direction. The gaze detector 125 can be configured to alternately estimate gaze direction by inputting images representing a photograph of a selected area near or around the eyes. It will be clear to those of ordinary skill in the art having the benefit of this disclosure that these techniques are explanatory only, as other modes of detecting gaze direction can be substituted in the gaze detector 125 of FIG. 1.

The face analyzer 123 can include its own image/gaze detection-processing engine as well. The image/gaze detection-processing engine can process information to detect a user's gaze point. The image/gaze detection-processing engine can optionally also work with the depth scans to detect an alignment of a user's head in three-dimensional space. Electronic signals can then be delivered from the imager 119 or the depth imager 120 for computing the direction of user's gaze in three-dimensional space. The image/gaze detection-processing engine can further be configured to detect a gaze cone corresponding to the detected gaze direction, which is a field of view within which the user may easily see without diverting their eyes or head from the detected gaze direction. The image/gaze detection-processing engine can be configured to alternately estimate gaze direction by inputting images representing a photograph of a selected area near or around the eyes. It can also be valuable to determine if the user wants to be authenticated by looking directly at device. The image/gaze detection-processing engine can determine not only a gazing cone but also if an eye is looking in a particular direction to confirm user intent to be authenticated.

Other components 122 operable with the one or more processors 106 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 122 can also include proximity sensors. The proximity sensors fall in to one of two camps: active proximity sensors and "passive" proximity sensors. Either the proximity detector components or the proximity sensor components can be generally used for gesture control and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter. Illustrating by example, in one the proximity sensor components comprise a signal receiver to receive signals from objects external to the housing 103 of the electronic device 100. In one embodiment, the signal receiver is an infrared signal receiver to receive an infrared emission from an object such as a human being when the human is proximately located with the electronic device 100. In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Additionally, detection of wavelengths in this range is possible from farther distances than, for example, would be the detection of reflected signals from the transmitter of a proximity detector component. In one embodiment, the proximity sensor components have a relatively long detection range so as to detect heat emanating from a person's body when that person is within a predefined thermal reception radius. For example, the proximity sensor component may be able to detect a person's body heat from a distance of about fifteen feet in one or more embodiments. The ten-foot dimension can be extended as a function of designed optics, sensor active area, gain, lensing gain, and so forth.

Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level. Simulations show that a group of infrared signal receivers can operate with a total current drain of just a few microamps.

In one embodiment, the signal receiver of each proximity sensor component can operate at various sensitivity levels so as to cause the at least one proximity sensor component to be operable to receive the infrared emissions from different distances. For example, the one or more processors 106 can cause each proximity sensor component to operate at a first "effective" sensitivity so as to receive infrared emissions from a first distance. Similarly, the one or more processors 106 can cause each proximity sensor component to operate at a second sensitivity, which is less than the first sensitivity, so as to receive infrared emissions from a second distance, which is less than the first distance. The sensitivity change can be effected by causing the one or more processors 106 to interpret readings from the proximity sensor component differently.

By contrast, proximity detector components include a signal emitter and a corresponding signal receiver, which constitute an "active IR" pair. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

The other components 122 can optionally include a barometer operable to sense changes in air pressure due to elevation changes or differing pressures of the electronic device 100. Where included, in one embodiment the barometer includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

The other components 122 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 100. Similarly, a temperature sensor can be configured to monitor temperature about an electronic device.

A context engine 126 can then operable with the various sensors to detect, infer, capture, and otherwise determine persons and actions that are occurring in an environment about the electronic device 100. For example, where included one embodiment of the context engine 126 determines assessed contexts and frameworks using adjustable algorithms of context assessment employing information, data, and events. These assessments may be learned through repetitive data analysis. Alternatively, a user may employ the user interface 104 to enter various parameters, constructs, rules, and/or paradigms that instruct or otherwise guide the context engine 126 in detecting multi-modal social cues, emotional states, moods, and other contextual information. The context engine 126 can comprise an artificial neural network or other similar technology in one or more embodiments.

In one or more embodiments, the context engine 126 is operable with the one or more processors 106. In some embodiments, the one or more processors 106 can control the context engine 126. In other embodiments, the context engine 126 can operate independently, delivering information gleaned from detecting multi-modal social cues, emotional states, moods, and other contextual information to the one or more processors 106. The context engine 126 can receive data from the various sensors. In one or more embodiments, the one or more processors 106 are configured to perform the operations of the context engine 126.

In one or more embodiments, the one or more processors 106 can be operable with the various authenticators of the authentication system 114. For example, the one or more processors 106 can be operable with a first authenticator and a second authenticator. Where more authenticators are included in the authentication system 114, the one or more processors 106 can be operable with these authenticators as well.

Figure 2:
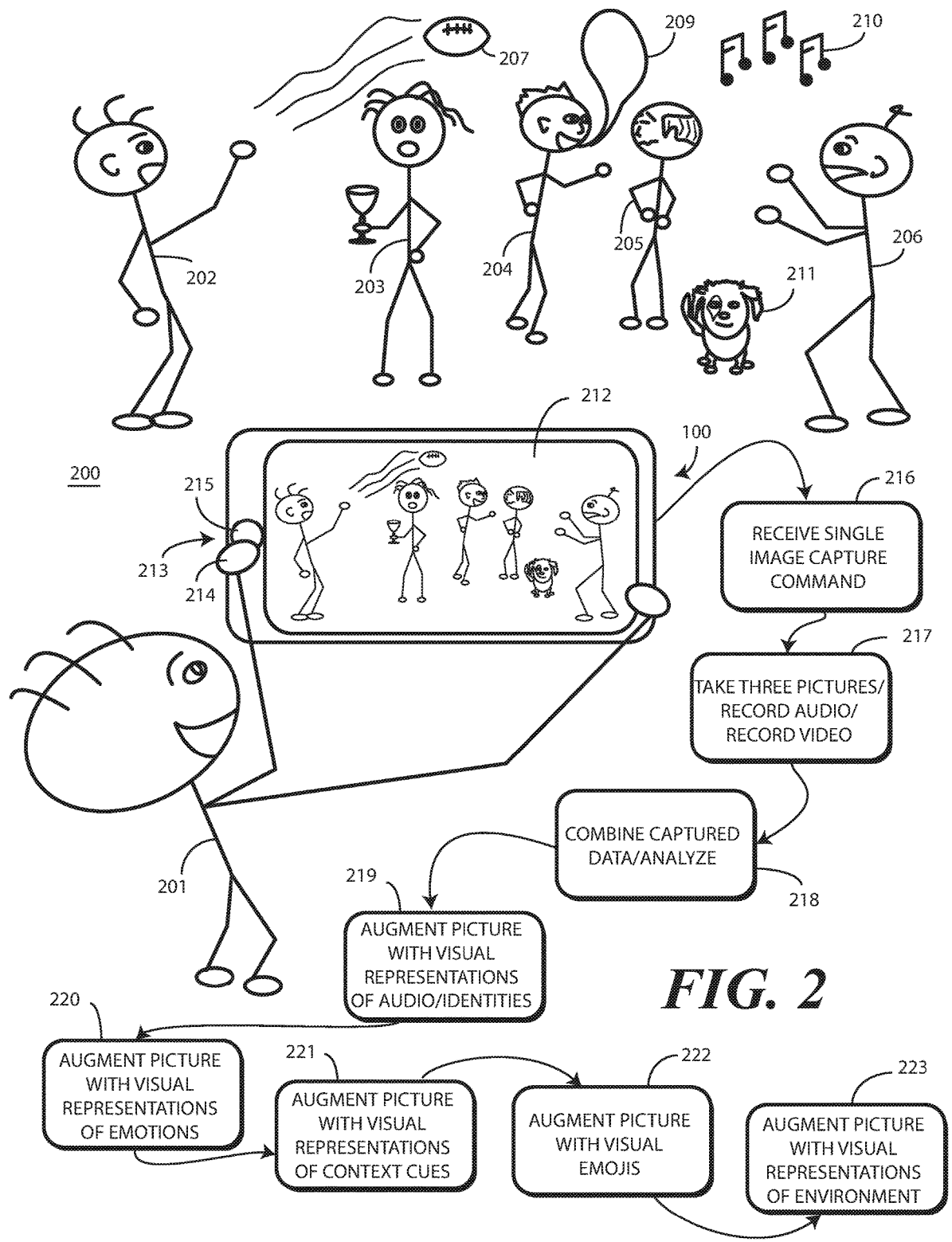
FIG. 2 illustrates one or more method steps in accordance with one or more embodiments of the disclosure.

Turning now to FIG. 2, illustrated therein is one explanatory system configured in accordance with one or more embodiments of the disclosure. An electronic device 100 is positioned within an environment 200. A plurality of persons 201, 202, 203, 204, 205, 206 is situated within the environment 200 of the electronic device 100. Here, there are six persons 201, 202, 203, 204, 205, 206 situated within the environment of the electronic device 100. Person 201 is an authorized user of the electronic device 100, while persons 202, 203, 204, 205, 206 are friends, family, or acquaintances of the authorized user. Persons 202, 203, 204, 205, 206 may be authorized by the authorized user to use the electronic device 100 in one or more embodiments. In other embodiments, persons 202, 203, 204, 205, 206 may be unauthorized users of the electronic device 100.

In this illustration, used to more particularly describe various features and advantages of embodiments of the disclosure, there is a lot occurring. The scene set forth in the environment 200 of the electronic device 100 is not dissimilar to that which may occur at a family gathering, family reunion, school reunion, and so forth. In this illustration, person 202 is passing a football 207 to person 206. Person 203 is watching the action while sipping on a cocktail 208. Person 204 is having a conversation 209 with person 205. Music 210 is playing. A dog 211 is enjoying the weather and dreaming of his next meal. Desirous of memorializing this moment of joy and whimsy, person 201 is capturing an image 212 of the environment.

In one or more embodiments, person 201 does this by delivering a single command 213 to a user interface (104) of the electronic device 100. In this illustration, person 201 delivers a single press to a button 215 with their finger 214 to deliver this single command 213 to the user interface (104) of the electronic device 100. In another embodiment, the person 201 may deliver the single command 213 to the user interface (104) of the electronic device 100 by touching a user interface target presented on the display 105. In another embodiment, person 201 may deliver the single command 213 to the user interface (104) of the electronic device 100 by delivering an audio command to an audio input of the electronic device 100. In still another embodiment, person 201 may deliver gesture input to deliver the single command 213 to the user interface (104) of the electronic device 100. In still another embodiment, person 201 delivers the single command 213 to the user interface (104) of the electronic device 100 by delivering touch or gesture input to a companion device of the electronic device 100, such as a smart watch.

In still another embodiment, person 201 may deliver a single command 213 to the user interface by performing a sequence of operations. Illustrating by example, in one or more embodiments person 201 can deliver the single command 213 by holding the electronic device (100) in a stationary position, as well as in a "pointing direction," i.e., not flat, while speaking or blinking an eye or swiping a hand above the display 105 in free space. Other methods for delivering the single command 213 could include speaking a "key phrase" such as "say cheese, "smile, " and so forth Still other methods for delivering the single command 213 to the user interface (104) of the electronic device 100 will be obvious to those of ordinary skill in the art having the benefit of this disclosure.

Regardless of how the person 201 delivers the single command 213 to the user interface (104) of the electronic device 100, in one or more embodiments the fact that only a single command 213 is delivered makes the person 201 perceive that they are capturing a single still image 212. From the perspective of person 201, it appears that an image capture application operating on the electronic device 100 has been launched and a single still image 212 is being captured.

At step 216, the electronic device 100 receives, at its user interface (104) the single command 213 to capture the image. In one or more embodiments, step 216 further comprises capturing, with an imager (119) of the electronic device 100, at least the image 212 in response to the single command 213 to capture the image 212.

In one embodiment, the capture of the image occurring at step 216 comprises capturing only a single still image 212. However, in an effort to seamlessly and passively—as perceived by person 201—capture more of the scene unfolding in the environment 200 of the electronic device 100, rather than capturing a single still image 212 of the environment, the one or more processors (106) of the electronic device 100 cause the various sensors of the electronic device 100 to passively capture additional information. As used herein, "passively" means that an operation or action occurs automatically and without an affirmative instruction from a user.

Thus, while person 201 delivers the single command 213, which is an affirmative instruction, to capture the single still image 212, in one or more embodiments the one or more processors (106) of the electronic device capture additional information without an affirmative instruction from person 201.

Illustrating by example, in one embodiment at step 217 the electronic device 100 captures additional information by receiving, concurrently with the capture of the image 212 at step 216, a predetermined amount of audio input with an audio input/processor 110 from the environment 200 of the electronic device 100. For instance, one or more microphones (113) may capture a predetermined duration, such as three to five seconds, of audio input as the predetermined amount of audio input. Audio input may be received at step 217, for example, when step 216 comprises capturing only a single still image 212 in response to the single command 213 to capture the image.

Alternatively, in another embodiment, the electronic device 100 captures additional information at step 217 by capturing, with the imager (119) of the electronic device 100, a plurality of images. For instance, in one embodiment step 217 comprises capturing three images instead of the single still image 212 in response to the single command 213 to capture the image 212. It should be noted that three images is one example for the number of images captured at step 217. In other embodiments, the plurality of images could be more, or fewer, than three images.

In one or more embodiments, the capture of images and/or audio input can be combined. Illustrating by example, in one or more embodiments, while capturing the three images at step 217, a microphone (113) of the electronic device 100 can capture corresponding audio input from the environment 200 about the electronic device 100. This audio, captured during the capture of the three images, can then be synthesized together at step 218 by the one or more processors (106) of the electronic device to create the predetermined amount of audio input captured from the environment 200 of the electronic device 100 at step 217.

In still another embodiment, the electronic device 100 captures additional information at step 217 by capturing, with the imager (119) of the electronic device 100, a predetermined amount of video input from the environment 200 of the electronic device 100. For instance, the imager (119) may capture a predetermined duration, such as three to five seconds, of video input (as well as the corresponding audio input associated with the video input as the predetermined amount of video input.

At step 218, the one or more processors (106) of the electronic device can perform analysis operations on the single still image 212, the predetermined amount of audio content, or the predetermined amount of video content captured at steps 216 and 217 as previously described. Illustrating by example, in one or more embodiments step 218 includes one or more sensors (115) of the electronic device 100, in conjunction with the one or more processors (106), identifying one or more of the plurality of persons 202, 203, 204, 205, 206 who are subjects of the single still image 212. If, for example, person 202 is a good friend of person 201, and is frequently within the environment 200 of the electronic device 100, the one or more sensors (115) and/or one or more processors (106) may be able to identify that person 202 in addition to identifying person 201 as the authorized user as described above with reference to FIG. 1. While person 202 may not be identified as the authorized user of the electronic device 100, they may still be identified for other purposes, as will be explained in more detail below.

Where, for example, only a single still image 212 is captured at step 216, the one or more processors (106) of the electronic device 100 can then use the face analyzer (123) and/or environmental analyzer (124) to determine that there are depictions of the one or more persons 202, 203, 204, 205, 206 in the single still image 212. A similar technique can be used where a plurality of images, e.g., three images, are captured at step 217. The technique can also be used where step 217 comprises capturing a predetermined duration of video input as well.

Alternatively, other techniques to determine that there are depictions of the one or more persons 202, 203, 204, 205, 206 in the single still image 212 can be used. For example, where an audio sensor such as the audio input/processor (110) of the electronic device 100 captures a predetermined amount of audio input at step 217, the one or more processors (106) of the electronic device 100 can use this audio input to detect that there are depictions of one or more of the persons 202, 203, 204, 205, 206 within the environment 200 of the electronic device 100 at step 218. When, for example, the audio input includes multiple voices, such as the voice from a man and a voice from a woman, the one or more processors (106) can perform audio processing on the audio input to determine that there are multiple speakers within the environment 200 of the electronic device 100, and therefore, that there are likely to be depictions of multiple persons 202, 203, 204, 205, 206 in the single still image 212. Other techniques for detecting that there are depictions of one or more persons within the environment 200 of the electronic device 100 will be obvious to those of ordinary skill in the art having the benefit of this disclosure.

Step 218 can also include identifying the persons 202, 203, 204, 205, 206 depicted in the single still image 212. In addition to identifying the authorized user of the electronic device 100, in one or more embodiments the electronic device 100 can use the same process further identify some or all of the persons 202, 203, 204, 205, 206 depicted in the single still image 212 provided the electronic device 100 has been previously trained. To wit, at step 218 can include the optical recognition performed by the authentication system (114), operating in conjunction with the face analyzer (123) and/or environmental analyzer (124), to identify any person who has corresponding identifying characteristics stored with the image or depth scan data in the memory (107).

Thus, where four persons 202, 203, 204, 205, 206 are within the environment 200 of the electronic device 100, the optical recognition performed by the authentication system (114) operating in conjunction with the face analyzer (123) and/or environmental analyzer (124) may identify these persons 202, 203, 204, 205, 206 as one of an authorized user of the electronic device 100, friends of the authorized user, relatives of the authorized user, and so forth. Accordingly, in one or more embodiments step 218 comprises identifying all identifiable persons in the single still image 212.

In another embodiment, step 218 can identify these persons 202, 203, 204, 205, 206 using a voice recognition engine incorporated into the audio input/processor 110. The voice recognition engine can comprise executable code, hardware, and various voice print templates (also referred to as "voice models"). The voice recognition engine can use the voice print templates to compare a voiceprint from received input and determine if a match exists. In operation, the voice recognition engine obtains voice data using at least one microphone (113) The voice recognition engine can extract voice recognition features from the voice data and generate a voiceprint. The voice recognition engine can compare the voiceprint to at least one predefined authentication reference, which may comprise a predefined voice print template.

In another embodiment, step 218 can identify these persons 202, 203, 204, 205, 206 using an iris scanner. The iris scanner can capture images and/or thermal or infrared scans of a person's iris. The iris scanner can employ either or both of visible and near-infrared light. The iris scanner can capture high-contrast images of a person's iris, and can compare these images to one or more predefined authentication references to determine if there is a match to determine the identity of the persons 202, 203, 204, 205, 206.

The examples set forth above are merely illustrative of various identification techniques that can be used with electronic devices in accordance with one or more embodiments of the disclosure to identify the persons 202, 203, 204, 205, 206 depicted in the single still image 212. The identification techniques can be used in alone or in combination. The identification techniques are illustrative only, and are not intended to provide a comprehensive list of the techniques for identifying the persons 202, 203, 204, 205, 206 depicted in the single still image 212. Numerous others will be obvious to those of ordinary skill in the art having the benefit of this disclosure.

The visual and audio techniques used for determining the identity of the persons 202, 203, 204, 205, 206 depicted in the single still image 212 can be used to identify other elements depicted in the single still image 212 as well. Illustrating by example, objects and landmarks can be detected in a similar fashion at step 218. Optical recognition performed by the one or more processors (106) operating in conjunction with the environmental analyzer (124) may identify objects or locations by comparing elements of the single still image 212 with one or more authentication references (111) stored in the memory (107) of the electronic device 100 to identify such objects and landmarks. Illustrating by example, the one or more processors (106) can compare the image of the dog 211 with one or more authentication references (111) stored in the memory (107) of the electronic device 100 to determine that the dog 211 is identifiable as Buster, the dog belonging to person 201. Vehicles, houses, historic landmarks, and geographic formations can be identified as well. Optical recognition can be used to read signs and billboards as well.

Step 218 can further include the location detector (116) determining where the single still image 212 is being taken. Accordingly, step 218 can comprise detecting the location of the environment 200 of the electronic device 100. The voice recognition techniques described above can be used to identify, for example, the music 210 that is playing at step 218. Step 218 can further include transcribing, with the one or more processors (106) of the electronic device 100, the audio input received at step 217 to transcribed text, and storing, in the memory (107) of the electronic device 100, the transcribed text. Step 218 can further include identifying at least one contextual cue from the audio input and/or images. Illustrating by example, in one or more embodiments the audio input or transcribed text can be analyzed at step 218 for laughter or sobbing to determine if someone is happy or sad. Image data can be analyzed to determine a person's emotions, such as whether they are quiet, happy, sad, laughing, angry, soft, loud, agitated, or experiencing another emotion. Additionally, image data can be analyzed to determine lip or mouth movement, in sync with captured audio, to determine who says what.

Accordingly, in one or more embodiments step 218 comprises analyzing content captured at step 216 and/or 217 and identifying objects therein, such as objects depicted, names or the persons 202, 203, 204, 205, 206 depicted, faces of the persons 202, 203, 204, 205, 206 depicted, landmarks, and so forth. From audio content, family voices, laughter, and spoken words can be identified and/or transcribed. Location data can be recorded at step 218 as well. Emotions of the persons 202, 203, 204, 205, 206 can be determined as well. Music 210 playing in the environment can be identified as well. Other examples of content that can be identified at step 218 will be obvious to those of ordinary skill in the art having the benefit of this disclosure.

Once this various content is identified, in one or more embodiments the one or more processors (106) of the electronic device 100 can then augment the single still image 212 with a visible representation of at least some of the identified content. For example, at step 219 the one or more processors (106) can augment the single still image 212 with a visible representation of at least some of the predetermined audio input received at step 217. Where step 218 comprises identifying, with one or more sensors (115) of the electronic device 100, one or more subjects in the single still image 212, i.e., one or more person of persons 202, 203, 204, 205, 206, step 219 can comprise further augmenting the single still image 212 with another visible representation of an identity of the one or more subjects in the single still image 212.

Alternatively, where step 218 comprises, identifying, with one or more sensors (115) of the electronic device 100, a mood or emotional state of one or more subjects in the at least the image, step 220 cam comprise augmenting the single still image 212 with another visible representation of the mood or emotional state of the one or more subjects in the single still image 212. As shown at step 222, this augmentation can include placing visible emojis along the single still image 212.

Where step 218 comprises identifying, with one or more sensors (115) of the electronic device 100, one or more contextual cues from the environment 200 of the electronic device 100, step 221 can comprise further augmenting the single still image 212 with another visible representation of the one or more contextual cues. Illustrating by example, where step 218 comprises identifying, with one or more sensors (115) of the electronic device 100, a behavior of one or more subjects in the single still image 212, step 221 can comprise further augmenting the single still image 212 with another visible representation of the behavior of the one or more subjects in the single still image 212.

Where step 218 comprises identifying, with one or more sensors (115) of the electronic device 100, information from the environment 200 of the electronic device 100, step 223 can comprise further augmenting the single still image 212 with another visible representation of the that information from the environment 200 of the electronic device 100. Illustrating by example, if the one or more processors (106) of the electronic device 100 identify the music 210 playing in the environment 200 of the electronic device 100 at step 218, step 223 can include augmenting the single still image 212 with the name of the song. Examples of each of these steps 219, 220, 221, 222, 223 will be described below with reference to FIGS. 4-6.

In a simple embodiment, audio captured from the environment 200 of the electronic device 100 can simply be attached to the single still image 212 as metadata. For example, in one embodiment step 216 comprises receiving, with the user interface (104) of the electronic device, the single command 213 to capture an image. As described, step 216 can further include capturing, with the imager (119) of the electronic device 100, at least the image in response to the single command 213 to capture the image.

In one embodiment, step 217 can comprise concurrently with the capturing at least the image, receiving, with a microphone (113), a predetermined amount of audio input from the environment 200 about the electronic device 100. In one embodiment, step 217 can further comprise attaching the audio captured from the environment 200 of the electronic device 100 to the single still image 212 as metadata. Illustrating by example, recall from above that in this scene, person 204 is having a conversation 209 with person 205. Captured audio from this conversation can be attached to the single still image 212 as metadata. This is shown in FIG. 3.

Figure 3:
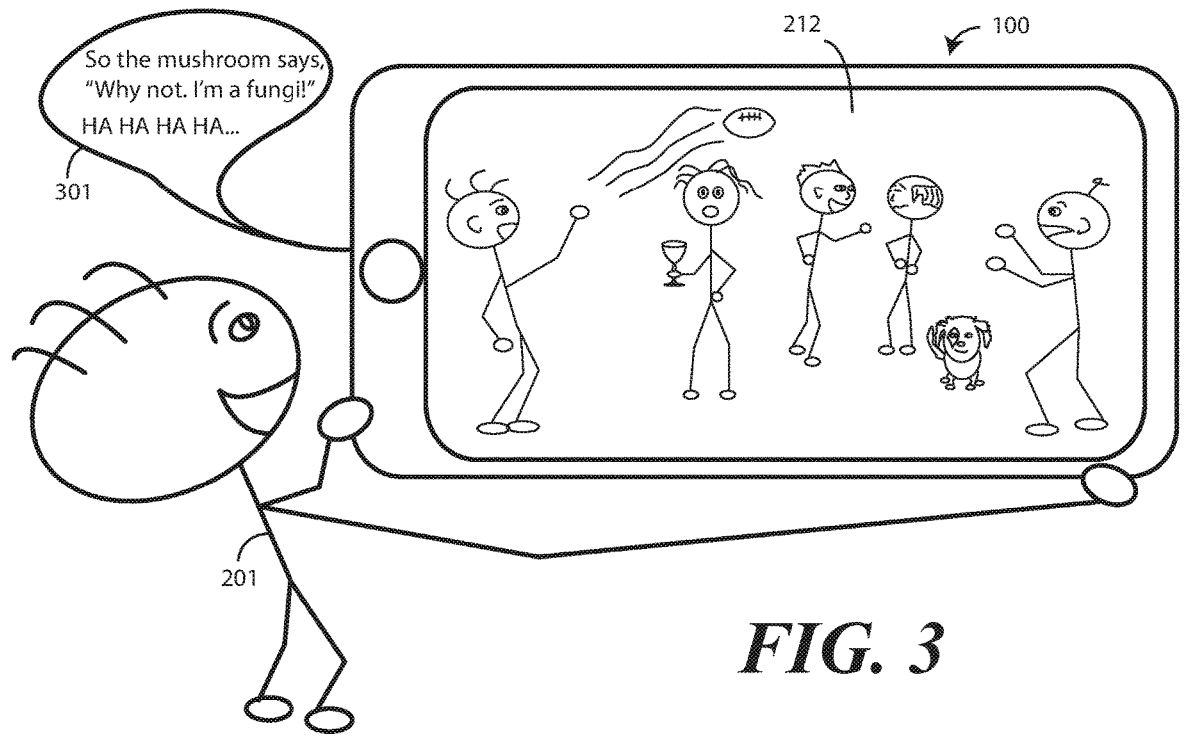
FIG. 3 illustrates one or more method steps in accordance with one or more embodiments of the disclosure.

Turning now to FIG. 3, person 201 is looking at the single still image 212. Since the one or more processors (106) of the electronic device 100 captured, at step (217) a predetermined amount of audio input 301 from the environment (200) about the electronic device 100, this predetermined amount of audio input 301 can be attached to the single still image 212 as metadata. Thus, when person 201 reviews the single still image 212 they can hear the punch line from the joke of the conversation (209). In one or more embodiments, person 201, by using a menu, can turn ON or OFF the metadata.

Figure 4:
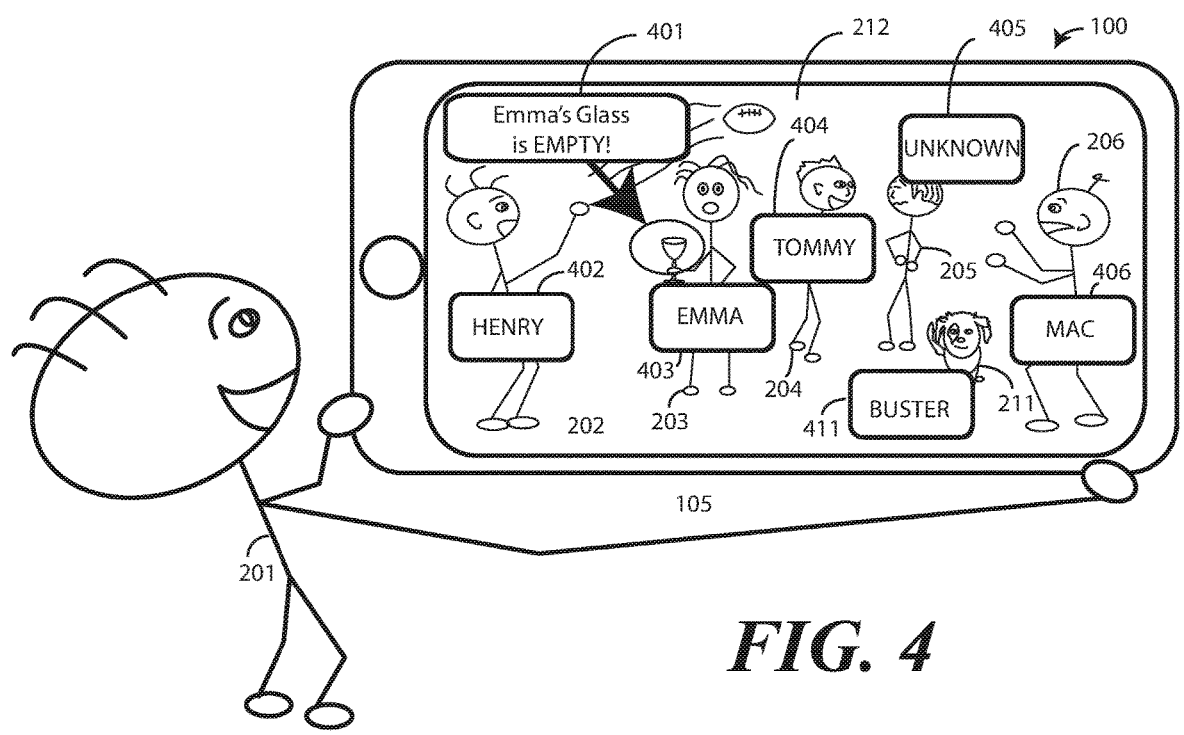
FIG. 4 illustrates one or more method steps in accordance with one or more embodiments of the disclosure.

While attaching audio is one option, embodiments of the disclosure contemplate that a more constructive way to add additional features that are meaningful to the user include augmenting the image with visible representation of information extracted and identified from the environment (200) of the electronic device. Turning now to FIG. 4, illustrated therein are some examples of such visible representations.

As shown in FIG. 4, person 201 is again looking at the single still image 212. As noted above with reference to FIG. 2, in one or more embodiments step (218) comprises identifying, with one or more sensors of the electronic device, one or more subjects in the at least the image. Where those subjects can be identified, step (219) can comprise augmenting the image, which is the single still image 212 in this example, with a visible representation of an identity of the one or more subjects in the image. This is occurring in FIG. 4.

While the authorized user, i.e., person 201, is not in the single still image 212 in this example, in one or more embodiments the electronic device 100 can use the same process used to identify the authorized user to further identify some or all of the subjects of the single still image 212 provided the electronic device 100 has been previously trained. To wit, when the imager (119) captures one or more images of the environment (200) of the electronic device 100, and that environment (200) comprises one or more persons 202, 203, 204, 205, 206, the optical recognition performed by the authentication system (114) operating in conjunction with the face analyzer (123) and/or environmental analyzer (124) allows for the identification of any person who has corresponding identifying characteristics stored with the image or depth scan data in the memory (107). Thus, where five persons 202, 203, 204, 205, 206 are within the environment (200) of the electronic device 100, the optical recognition performed by the authentication system (114) operating in conjunction with the face analyzer (123) and/or environmental analyzer (124) may identify one a friend of the authorized user, one as a cousin of the authorized user, and so forth.

Thus, in one or more embodiments, the authentication system (114) and/or the one or more processors (106) identify all identifiable persons 202, 203, 204, 206 appearing as subjects in the single still image 212. IN this example, person 202 is identified as Henry, while person 203 is identified as Emma. Person 204 is identified as Tommy, while person 206 is identified as Mac. In this illustration, even the dog 211 is identified as Buster. However, person 205 is unknown.

As noted above, where one or more persons 202, 203, 204, 206 can be identified, step (219) of the method depicted in FIG. 2 can comprise augmenting the single still image 212 with a visible representation of an identity of the one or more subjects in the single still image 212. Here, the augmentation occurs by placing a banner label 402, 403, 404, 406, 411 on each subject that can be identified. In this illustrative embodiment, each banner label 402, 403, 404, 406, 411 comprises an identifier of the corresponding person, which in this case is the person's name. For example, banner label 402 says, "Henry," while banner label 403 says, "Emma." Banner label 404 says, "Tommy," while banner label 406 says, "Mac." Banner label 411 says, "Buster."

While the person's name is one acceptable identifier for each banner label 402, 403, 404, 406, 411, other identifiers could be used as well. These identifiers include familial relationships, birthdates, nicknames, aliases, pseudonyms, assumed names, stage names, noms de plumes, noms de guerre, or allonyms. For example, using nicknames, banner label 402 could say, "Always Hungry," while banner label 403 says, "Princess." Banner label 404 could say, "Mr. Bahama," while banner label 406 could say, "Dolcetto." Banner label 411 could similarly say, "Sir." Other suitable identifiers for use on the banner labels 402, 403, 404, 406, 411 will be obvious to those of ordinary skill in the art having the benefit of this disclosure. In one or more embodiments, person 201 has the option to turn the presentation of the banner labels 402, 403, 404, 406, 411 ON or OFF, for example by using a menu, when sharing media or performing other operations.

In this illustrative embodiment, person 205 could not be identified. In one embodiment, when the one or more processors (106) of the electronic device 100 augment the single still image 212 with a visible representation of an identity of the one or more subjects in the single still image 212, person 205 could receive no augmentation, i.e., would have no banner label or a question mark is placed next to him indicating that he is unknown, due to the fact that he has not been identified. In this illustration, person 205 still receives a banner label 405 with an identifier. In this illustration, the identifier says, "unknown." Other ways to indicate that a person has not been identified will be obvious to those of ordinary skill in the art having the benefit of this disclosure. For example, the unidentified person could simply be augmented with a generic man or woman emoji.

Recall from above with reference to FIG. 2, in one or more embodiments step (218) comprises identifying, with one or more sensors (115) of the electronic device 100, one or more contextual cues from the environment (200) of the electronic device 100. Step (221) then comprises, in one or more embodiments, further augmenting the single still image 212 with another visible representation of the one or more contextual cues. This has been done in FIG. 4.

To wit, the one or more processors (106) of the electronic device have determined by analyzing the colors of the single still image 212 that Emma's glass is empty. Accordingly, in this illustration the one or more processors (106) augment the single still image 212 with a visible representation 401 of this context. In this example, the visible representation comprises a banner message, overlaid on the single still image 212, that says, "Emma's glass is EMPTY!" Other examples of contextual cues will be described below. Still others will be obvious to those of ordinary skill in the art having the benefit of this disclosure.

It should be noted that one or both of the banner labels 402, 403, 404, 406, 411 and/or the visible representation 401 can be clear in one embodiment so that more of the single still image 212 can be seen beneath. In other embodiments, one or both of the banner labels 402, 403, 404, 406, 411 and/or the visible representation 401 can be opaque such that the identifiers are easier to read. Moreover, here the single still image 212 is augmented by overlaying one or both of the banner labels 402, 403, 404, 406, 411 and/or the visible representation 401 atop the image. In other embodiments, a table on the side of the single still image 212, optionally with arrows pointing to identified objects, can be used. Other configurations for augmentation will be obvious to those of ordinary skill in the art having the benefit of this disclosure.

In one or more embodiments, when the single still image 212 has been augmented with one or both of the banner labels 402, 403, 404, 406, 411 and/or the visible representation 401, the user, here person 201, has the option of selectively enabling or disabling one or both of the banner labels 402, 403, 404, 406, 411 and/or the visible representation 401. For example, person 201 may tap the display 105 to make one or both of the banner labels 402, 403, 404, 406, 411 and/or the visible representation 401 disappear, thereby revealing the entire single still image 212. Alternatively, person 201 may tap the display 105 again to make one or both of the banner labels 402, 403, 404, 406, 411 and/or the visible representation 401 appear again.

The embodiment of FIG. 4 shows advantages of the disclosure. While person 201 perceived that they were simply taking a picture using the electronic device 100, the one or more processors (106) and other components passively captured much more information. Additionally, the one or more processors (106) and other components augmented the single still image with visible representations of this captured information to provide person 201 with a richer experience. Moreover, the augmentation allows for easier searching of images as well, as noted above.

In other embodiments, the augmentation of the single still image 212 comprises "tagging" the single still image 212 with information. As the term is used in the art, "tagging" means attaching a keyword or phrase to a portion of content, or to assign a portion of content to a specific person. Illustrating by example, where the single still image 212 includes depictions of the plurality of persons 202, 203, 204, 205, 206, the optional tagging can include assigning a name, descriptor, adjective, emoji, or other information to depictions of persons 202, 203, 204, 205, 206. Tags can be applied to voices, communications, and other data as well.

Figure 5:
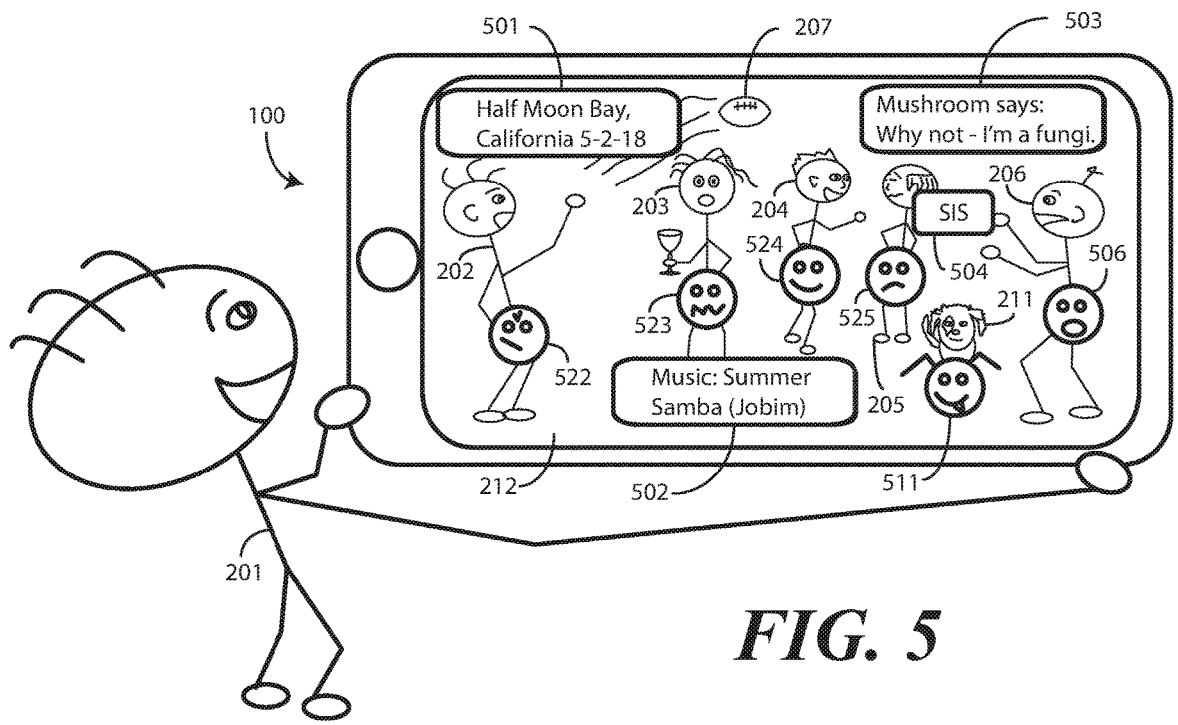
FIG. 5 illustrates one or more method steps in accordance with one or more embodiments of the disclosure.

Turning now to FIG. 5, illustrated therein are other ways in which the single still image 212 can be augmented with other captured information. In one or more embodiments, the one or more processors (106) of the electronic device 100 determine, with the location detector (116), a location in which the single still image 212 is taken. Where this occurs, in one or more embodiments the one or more processors (106) of the electronic device 100 augment the single still image with a visible representation of location where the single still image 212 was taken. Here, the augmentation occurs by placing a banner label 501 on the single still image 212. In this illustrative embodiment, the banner label 501 comprises an identifier of the location, which in this case includes the location's name and date. For example, banner label 501 in this illustration says, "Half Moon Bay, Calif. 5-2-18." Other location, time, and date identifiers will be obvious to those of ordinary skill in the art having the benefit of this disclosure.

Recall from above with reference to FIG. 2, in one or more embodiments step (218) comprises identifying, with one or more sensors (115) of the electronic device 100, one or more contextual cues from the environment (200) of the electronic device 100. Step (221) then comprises, in one or more embodiments, further augmenting the single still image 212 with another visible representation of the one or more contextual cues. In one or more embodiments, the one or more contextual cues comprise music (210) playing in an environment (200) of the electronic device 100.

In this illustrative embodiment, the one or more processors (106) have identified the music (210) playing in the environment (200) of the electronic device 100 by performing analysis operations on the predetermined amount of audio input captured at step (217) of the method described above with reference to FIG. 2. In this illustrative embodiment, since the one or more processors (106) have identified this contextual cue, the one or more processors (106) further augment the single still image with another visible representation 502. In this illustrative embodiment, the visible representation 502 comprises an identifier of the music, composer, and artist, which states, "Music: Summer Samba (Jobim)." Other contextual cue identifiers will be obvious to those of ordinary skill in the art having the benefit of this disclosure.

In one or more embodiments the one or more processors (106) of the electronic device 100 capture, at step (217) of FIG. 2, a predetermined amount of audio input (301) from the environment (200) about the electronic device 100. When this occurs, in one or more embodiments the one or more processors (106) augment the single still image 212 with a visible representation 503 of the predetermined amount of audio input (301).

In this illustration, the one or more processors (106) have transcribed the predetermined amount of audio input (301). In this illustrative embodiment, to make the transcribed audio input visible, the one or more processors (106) augment the single still image 212 with another visible representation 503. In this illustrative embodiment, the visible representation 503 comprises a banner label having the transcribed predetermined amount of audio input presented thereon. Thus, when person 201 reviews the single still image 212 they can read the punch line from the joke of the conversation (209). Accordingly, in one or more embodiments where the one or more processors (106) augment the single still image 212 with a visible representation 503 of at least some of the predetermined amount of audio input (301), the visible representation 503 comprises a depiction, here the banner label, of a transcription of at least some of the predetermined amount of audio input (301).

Embodiments of the disclosure contemplate that in some instances the transcription of at least some of the predetermined amount of audio input (301) will be to voluminous to present on the single still image 212. In one embodiment, the one or more processors (106) can simply choose a portion of the predetermined amount of audio input (301) for presentation by concatenating the predetermined amount of audio input (301). Said differently, the one or more processors (106) can simply select a "sound bite" from the predetermined amount of audio input (301) for presentation.

In other embodiments, where appropriate, the one or more processors (106) can create one or more contractions from at least some of the predetermined amount of audio input (301). Where this occurs, the visible representation 503 can comprise a depiction of the one or more contractions. In one or more embodiments, the contractions comprise socially understood abbreviations, such as "LOL," which means that a subject is laughing out loud.

In this illustrative embodiment, the one or more processors (106) determine, with the audio input/processor (110), that person 205 is not happy with the joke of the conversation (209) by determining the mood of person 205. The one or more processors (106) can determine this mood, for example, when the audio input/processor (110) detects moaning and groaning sounds. Alternatively, using the face analyzer (123), the one or more processors (106) can detect the painful grimace on the face of person 205. In one or more embodiments, when the one or more processors (106) determine this mood, the one or more processors (106) further augment the image with another visible representation 504 of the mood of the one or more subjects in the single still image 212. In this illustrative embodiment, the one or more processors (106) create a contraction of this mood, and the visible representation 504 comprises a depiction of the one or more contractions. Here, since person 205 is unhappy, the emotion is the opposite of laughing out loud, which is sobbing inside softly. Accordingly, the socially understood contraction "SIS" is presented on the visible representation 504.

Mood of the subjects of the single still image 212 can be communicated in other ways as well. For example, the one or more processors (106) have identified the mood of each person 202, 203, 204, 205, 206 and the dog 211 depicted in the single still image 212. As noted above, mood detection can come from performing analysis operations either on the image content captured at step (217) of FIG. 2 or the audio content or voice characteristics, such as whether they are loud, different, and so forth captured at this step. The audio input/processor (110) can, for example, listen for sounds of laughing, crying, and so forth. Or, as noted, the one or more processors (106) can detect expressions on the face of person 205, motion of a person, upward intonations of voices, downward intonations of voices, rapid pace of speech, slow pace of speech, and so forth to determine mood. In one or more embodiments, when the one or more processors (106) determine this mood, the one or more processors (106) further augment the image with another visible representation of the mood of the one or more subjects in the single still image 212.

In one embodiment, the visible representation of the mood of the one or more subjects of the single still image 212 comprises placing one or more emojis 522, 523, 524, 525, 526, 511 atop the one or more subjects of the single still image 212. Each emoji 522, 523, 524, 525, 526, 511 in this illustration quickly and succinctly shows the mood of each subject. For example, emoji 522 shows an expenditure of effort, as person 202 is throwing the football. Emoji 523 shows worry, first, because person 203 has an empty glass and, second, because person 203 is visibly worried that the football 207 will hit person 205 in the head since their eyes are closed due to the painful grimace caused by the bad mushroom joke. Emoji 524 shows happiness because person 204 loves the mushroom joke. Emoji 525 shows unhappiness associated with the painful grimace. Emoji 526 shows fear because person 206 is fearful that they will drop the football 207, thereby embarrassing himself before the group. Emoji 511 shows that Buster is happy due to the fact that its tail is wagging.

Figure 6:
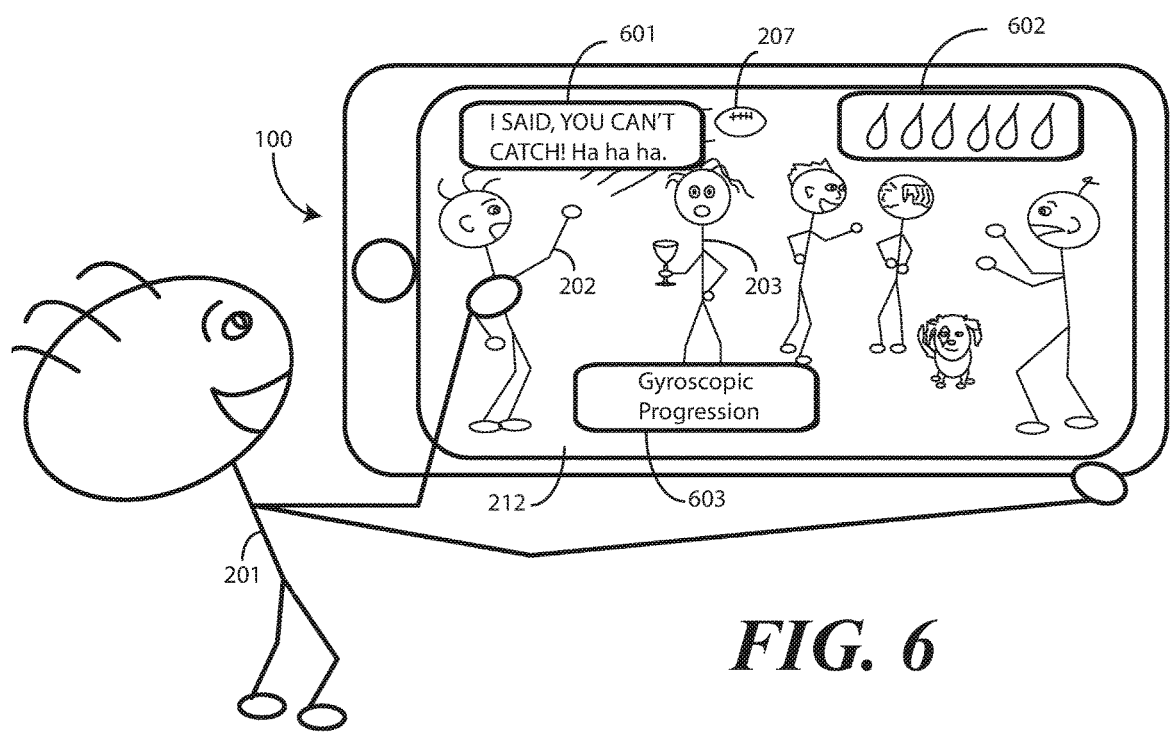
FIG. 6 illustrates one or more method steps in accordance with one or more embodiments of the disclosure.

Turning now to FIG. 6, in one or more embodiments the one or more processors (106) of the electronic device 100 further identify, at step (218) of FIG. 2, a behavior of one or more subjects of the single still image 212. In one or more embodiments, this behavior comprises one of laughter or crying. This is occurring in FIG. 6.

Visible representation 601 comprises a transcription of at least some recorded audio in which person 202 shouts, "I said you can't catch," followed by laugher. In this illustrative embodiment, both mood and laughter are shown in the visible representation. Mood is detected by the volume of speech emitted by person 202. This volume, being a shout, shows an excited mood. This is represented in visible representation 601 by placing the transcribed audio content all in capital letters. Laugher is represented in visible representation 601 by the abbreviations, "Ha," "Ha," and "Ha." Crying is represented in visible representation 602 by placing the images of several teardrops atop the banner label. Other ways of augmenting the single still image 212 to demonstrate mood and/or behavior of the subjects of the single still image 212 will be obvious those of ordinary skill in the art having the benefit of this disclosure.

In this illustration, person 203 happens to be an astrophysicist. As such, she understands that the spiral of the football 207 is governed by the laws of Newtonian physics. Mesmerized by the passing football 207, she starts speaking with scientific jargon that no one else in the scene understands. As used herein, "jargon" means special words or expressions that are used by a particular profession or group and that are difficult for others to understand, e.g., "legal jargon." She starts speaking of launch angle, release velocity, and gyroscopic torque that causes the football 207 to rotate about its horizontal axis.

In one or more embodiments, the one or more processors (106) of the electronic device 100 derive this jargon from the predetermined audio input captured by the one or more sensors (115) of the electronic device 100. Since there is too much science to succinctly present on the single still image 212 via augmentation, and as the jargon is likely over the head of person 201 anyway, in one or more embodiments the one or more processors (106) consult a remote device across a network to determine that each part of the jargon, i.e., launch angle, release velocity, and gyroscopic torque, relates to gyroscopic progression. Accordingly, in one or more embodiments the one or more processors augment the signal still image with a banner label 603 that includes a hyper link to a scientific article on gyroscopic progression. Accordingly, should person 201 desire to find out more about the jargon, they can touch the link to read up about said physics.

Figure 7:
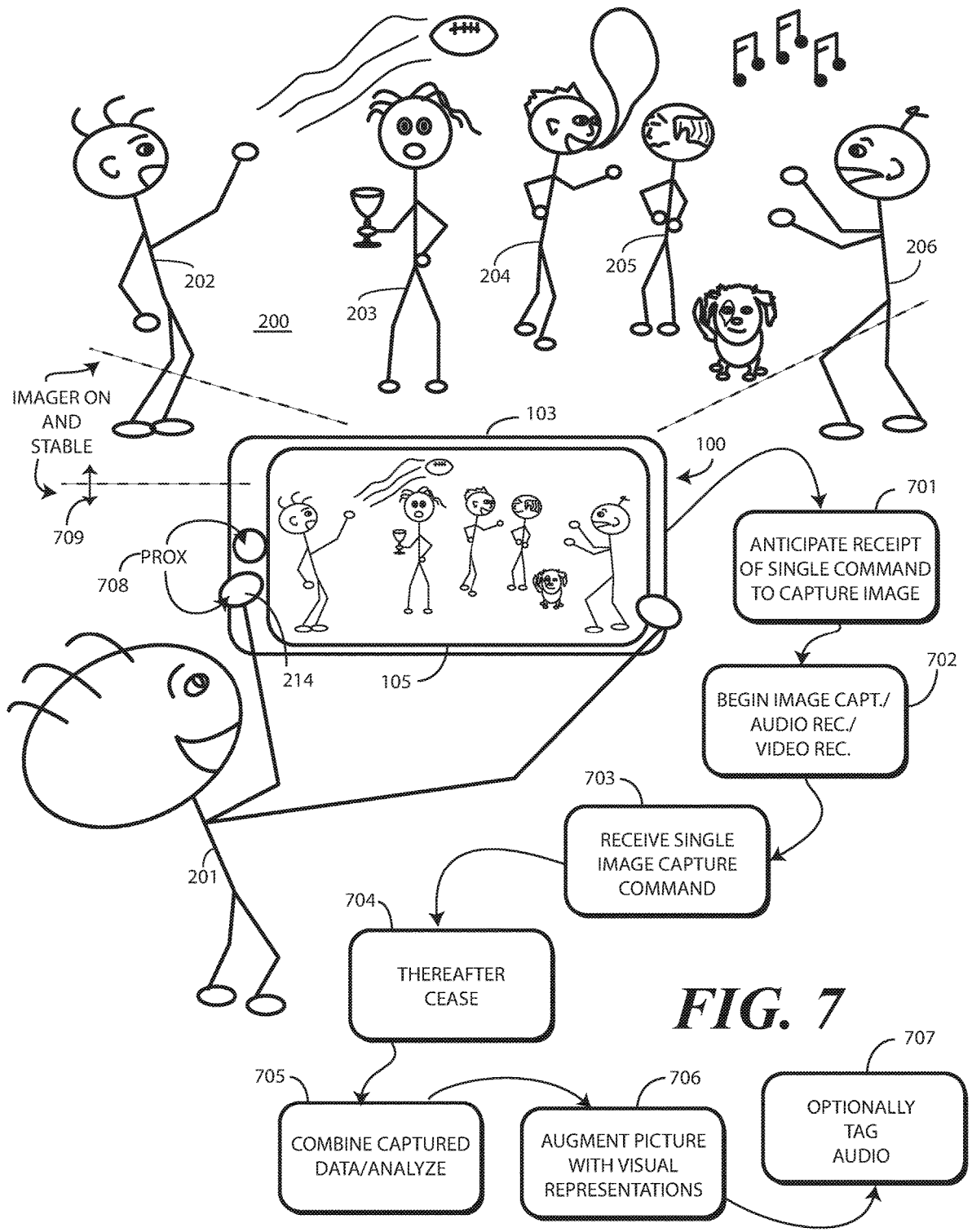
FIG. 7 illustrates one or more method steps in accordance with one or more embodiments of the disclosure.

Turning now to FIG. 7, illustrated therein is another explanatory system configured in accordance with one or more embodiments of the disclosure. As was the case in FIG. 2 above, an electronic device 100 is positioned within an environment 200. As previously described, a user interface (104) of the electronic device 100 can receive a single command to capture an image. An imager (119) of the electronic device 100 can capture at least the image in response to the single command to capture the image. One or more sensors (115) of the electronic device 100 can determine contextual input, such as identities of the subjects of the image, from the environment 200 of the electronic device 100 while the imager (119) captures the at least the image. One or more processors (106) of the electronic device 100 can augment the image with a visible representation of the contextual input to create a single augmented image.

In this example, a plurality of persons 201, 202, 203, 204, 205, 206 is situated within the environment 200 of the electronic device 100. Here, there are six persons 201, 202, 203, 204, 205, 206 situated within the environment of the electronic device 100. The scene is the same as that described above with reference to FIG. 2.

Embodiments of the disclosure contemplate that it can be advantageous to anticipate the single command to capture the image. This allows for step 702, which is largely the same as step (217) above, to commence prior to the capture of a single still image. Accordingly, at step 701 the method of FIG. 7 anticipates, with the one or more processors (106) of the electronic device 100, the receipt of the single command to capture the image.

This anticipation can be done in various ways. In one or more embodiments, proximity sensors are used. Illustrating by example, in one or more embodiments a touch sensor can be integrated with the display 105 or housing 103 of the electronic device 100. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors (106), to detect an object in close proximity with—or touching—the surface of the display 105 or the housing 103 of the electronic device 100 by establishing electric field lines between pairs of capacitive sensors and then detecting perturbations of those field lines. Accordingly, in one embodiment step 701 comprises detecting a proximity 708 of a users finger 214 from the surface of the display 105 or the housing 103 of the electronic device 100, when the imager (119) is active, to anticipate receipt of the single command to capture the image.

In another embodiment, a proximity sensor can be used. The other components (122) of the electronic device 100 can include proximity sensors. The proximity sensors can be active proximity sensors or passive proximity sensors. Either the proximity detector components or the proximity sensor components can be generally used to detect proximity 708 of a users finger 214 from the surface of the display 105 or the housing 103 of the electronic device 100, when the imager (119) is active, to anticipate receipt of the single command to capture the image. Accordingly, in one or more embodiments step 701 comprises detecting, with a proximity sensor of the electronic device 100, an object, such as the finger 214 of a user, approaching a user interface control of the user interface (104), one example of which is the display 105.

In still another embodiment, an orientation detector (117) of the electronic device 100 can be used to anticipate receipt of the single command to capture the image. Illustrating by example, when a motion detector determines stability 709 of the electronic device, while the imager is active, this combination of states of operation can be used to anticipate receipt of the single command to capture the image. Accordingly, in one or more embodiments step 701 comprises concurrently detecting, with the user interface (104) of the electronic device, actuation of the imager (119) of the electronic device 100 and, with one or more motion sensors, stability 709 of the electronic device 100.

In still another embodiment, where the electronic device 100 includes multiple imagers (119), a front facing imager can detect the authorized user, while a rear facing imager detects other people within a field of view to anticipate the receipt of the single command to capture the image. Alternatively, the front facing imager can detect the authorized user, while a rear facing imager detects a landscape scene to anticipate the receipt of the single command to capture the image.

In yet another embodiment, anticipation of receipt of the single command to capture the image can be triggered by recognizing a device posture (stationary and non-flat), recognizing the authorized user with a front facing imager and one or more persons within a field of view of a rear facing imager, or by capturing voice command that defines a key phrase associated with picture taking, e.g., "ready" or "smile," or by confirming people and device owner or no longer moving an all looking into device direction. Other techniques for anticipating receipt of the single command to capture the image will be obvious to those of ordinary skill in the art having the benefit of this disclosure.

At step 702, and prior to receiving the single command to capture the image, in one or more embodiments the one or more processors (106) of the electronic device initiate, with an audio input device, receipt of audio input from an environment of the electronic device. Alternatively, the one or more processors (106) can capture additional information at step 702 by capturing, with the imager (119) of the electronic device 100, a plurality of images. For instance, in one embodiment step 702 comprises capturing three images.

In one or more embodiments, the capture of images and/or audio input can be combined. Illustrating by example, in one or more embodiments, while capturing the three images at step 702, a microphone (113) of the electronic device 100 can capture corresponding audio input from the environment 200 about the electronic device 100. This audio, captured during the capture of the three images, can then be synthesized together at step 705 by the one or more processors (106) of the electronic device to create the predetermined amount of audio input captured from the environment 200 of the electronic device 100.

In still another embodiment, the electronic device 100 captures additional information at step 702 by capturing, with the imager (119) of the electronic device 100, a predetermined amount of video input from the environment 200 of the electronic device 100. For instance, the imager (119) may capture a predetermined duration, such as three to five seconds, of video input (as well as the corresponding audio input associated with the video input as the predetermined amount of video input.

At step 703, a user interface (104) of the electronic device 100 receives the single command (213) to capture the image. In one or more embodiments, step 703 further comprises capturing, with an imager (119) of the electronic device 100, at least the image in response to the single command (213) to capture the image. In one embodiment, the capture of the image occurring at step 703 comprises capturing only a single still image 212.

At step 704, which occurs after step 703 in one or more embodiments, the activity of step 702 ceases. Accordingly, this step 704 can comprise ceasing, with the audio input device, receipt of the audio input from the environment 200 of the electronic device 100. Where step 702 includes the imager (119) of the electronic device 100 capturing a plurality of images, this successive image capture can cease at step 704. Where step 702 included the imager (119) of the electronic device 100 capturing a predetermined amount of video input from the environment 200 of the electronic device 100, this activity can cease at step 704.

At step 705, the method shown in FIG. 7 performs the operations described above at step (218) of FIG. 2. At step 706, the method shown in FIG. 7 performs the operations described above at any of steps (219, 220, 221, 222, 223) of FIG. 2. At step 707, the method shown in FIG. 7 performs the operations described above with reference to FIG. 3.

Figure 8:
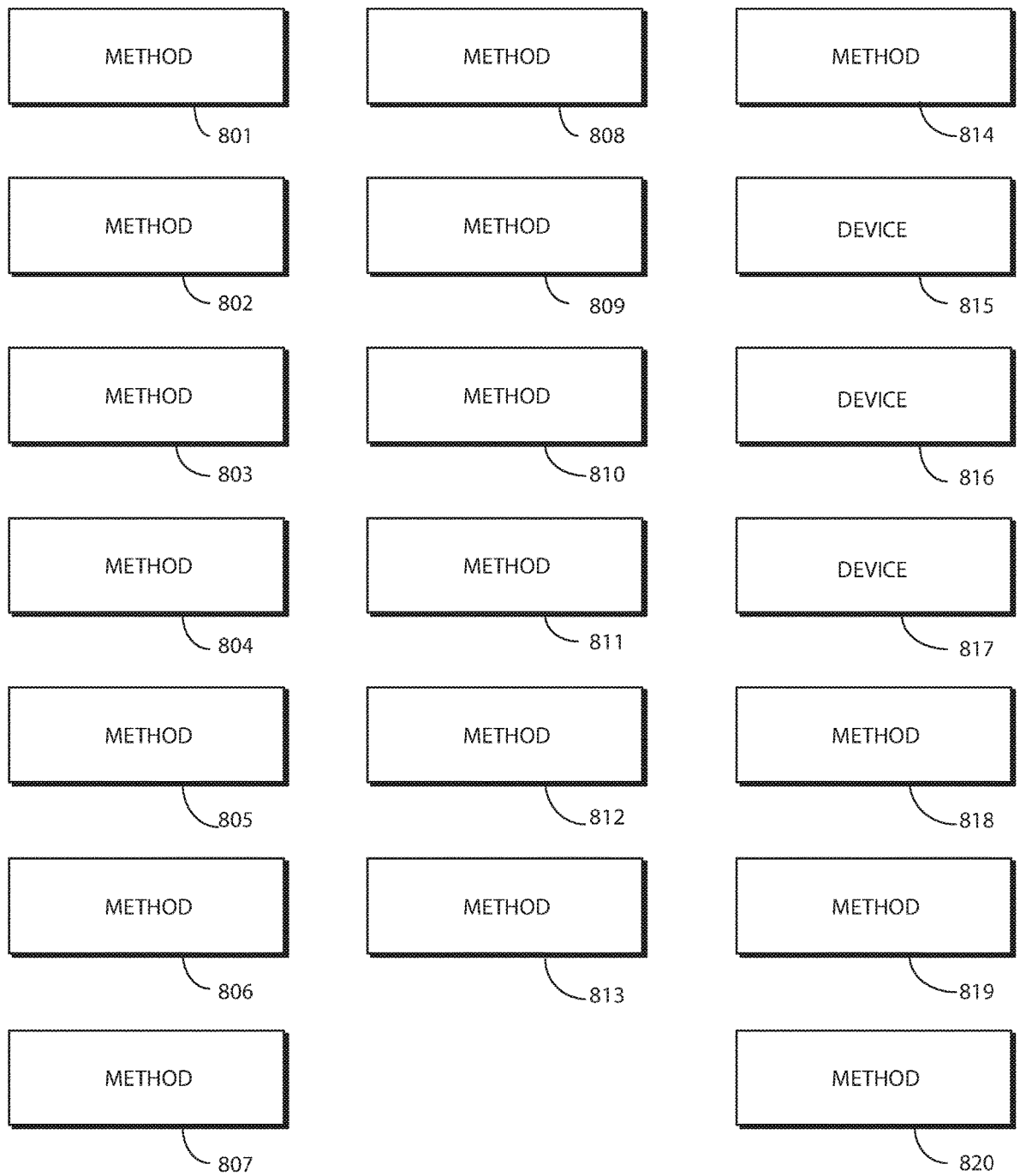
FIG. 8 illustrates one or more method steps in accordance with one or more embodiments of the disclosure.

Turning now to FIG. 8, illustrated therein are various embodiments of the disclosure. At 801, a method in an electronic device comprises receiving, with a user interface of the electronic device, a single command to capture an image. At 801, the method comprises capturing, with an imager of the electronic device, at least the image in response to the single command to capture the image. At 801, the method comprises, concurrently with the capturing at least the image, receiving, with an audio input device, a predetermined amount of audio input from an environment about the electronic device. At 801, the method comprises augmenting the image with a visible representation of at least some of the predetermined amount of audio input.

At 802, the capturing of the at least the image at 801 comprises capturing only a single still image. At 803, the capturing of the at least the image at 801 comprises capturing a plurality of still images. At 804, the capturing of the at least the image at 801 comprises capturing a predetermined duration of video input.

At 805, the method of 801 comprises identifying, with one or more sensors of the electronic device, one or more subjects in the at least the image. At 805, the method of 801 comprises further augmenting the image with another visible representation of an identity of the one or more subjects in the image.

At 806, the method of 801 comprises identifying, with one or more sensors of the electronic device, a mood of one or more subjects in the at least the image. At 806, the method of 801 comprises further augmenting the image with another visible representation of the mood of the one or more subjects in the image.

At 807, the visible representation of 806 comprises an emoji. At 808, the visible representation of 801 comprises a depiction of a transcription of at least some of the predetermined amount of audio input.

At 809, the method of 801 comprises creating, with one or more processors of the electronic device, one or more contractions from at least some of the predetermined amount of audio input. At 809, the visible representation of 801 comprises a depiction of the one or more contractions.

At 810, the method of 801 comprises identifying, with one or more sensors of the electronic device, one or more contextual cues from the environment of the electronic device. At 810, the method of 801 comprises further augmenting the image with another visible representation of the one or more contextual cues.

At 811, the one or more contextual cues of 810 comprise a volume of speech emitted by one or more subjects in the at least the image. At 812, the one or more contextual cues of 810 comprise music playing in the environment of the electronic device, wherein the other visible representation comprises an identifier of the music.

At 813, the method of 801 comprises identifying, with one or more sensors of the electronic device, a behavior of one or more subjects in the at least the image. At 813, the method of 801 comprises further augmenting the image with another visible representation of the behavior of the one or more subjects in the image. At 814, the behavior of 813 comprises one of laughter or crying.

At 815, an electronic device comprises a user interface receiving a single command to capture an image. At 815, the electronic device comprises an imager capturing at least the image in response to the single command to capture the image. At 815, the electronic device comprises one or more sensors determining contextual input from an environment of the electronic device while the imager captures the at least the image. At 815, the electronic device comprises one or more processors augmenting the image with a visible representation of the contextual input to create a single augmented image.

At 816, the contextual input of 815 comprises an identity of one or more subjects in the image. At 817, the contextual input of 815 comprises audio input. At 817 the visible representation of 815 comprises one or more of a contraction derived from the audio input, an identifier of music in the audio input, an identifier of a volume of the audio input, or jargon derived from the audio input.

At 818, a method comprises anticipating, with one or more processors of the electronic device, receipt of a single command to capture an image. At 818, the method comprises, prior to receiving the single command to capture the image, initiating, with an audio input device, receipt of audio input from an environment of the electronic device. At 818, the method comprises receiving, with a user interface of the electronic device, the single command to capture the image. At 818, the method comprises thereafter ceasing, with the audio input device, receipt of the audio input from the environment of the electronic device. At 818, the method comprises augmenting, with the one or more processors, the image with a visible representation of the audio input to create a single augmented image.

At 819, the anticipating of 818 comprises concurrently detecting, with the user interface, actuation of an imager of the electronic device and, with one or more motion sensors, stability of the electronic device. At 820, the anticipating of 818 comprises detecting, with a proximity sensor of the electronic device, an object approaching a user interface control of the user interface.

As illustrated and described, embodiments of the disclosure passively conduct object recognition following the capture of an image, identifying the "who, what, and where" associated with the image. In one or more embodiments, a single command to capture an image causes a series of images to be captured. Audio content associated with these images can be stitched together to obtain a predetermined amount of audio input. This audio can be combined into sound bites and optionally tagged to the image.

In one or more embodiments, the motions of subjects of an image can be determined. Those emotions can then be tagged to the image by overlaying an "emotion" emoji. As described, emotions can be determined via facial recognition, audio capture, spoken words, loudness, laughter, etc.

In one or more embodiments a single still image is captured in response to the single command to capture an image. However, while doing so embodiments of the disclosure passively record audio for a brief period. The audio recording period can start prior to capturing the image using the anticipation described with reference to FIG. 7. For example, in one embodiment as soon as a "camera" application is launched, and user posture indicates camera-taking mode is supported by the launched application, and one or both of an accelerometer or gyroscope detect stillness of the electronic device, receipt of a single command to capture an image is anticipated.

The single command to can be delivered in a variety of ways, including touch, gesture, or even spoken commands such as, "OK, lets take a pic."

In one or more embodiments, captured audio is processed and augmented to the single still image. This can be augmented in the form of a brief caption. Emotions can be converted to socially identifiable contraction. For example, laughter can be converted to the contraction "LOL." In one or more embodiments, if there is music playing in the background, the name of the song is identified and added to the image by augmentation. In one or more embodiments, conversation and/or context is "translated" into condensed social media jargon and attached to image by augmentation.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
   receiving, with a user interface of the electronic device, a single command to capture an image;
   capturing, with an imager of the electronic device, at least the image in response to the single command to capture the image;
   concurrently with the capturing at least the image, receiving, with an audio input device, a predetermined amount of audio input from an environment about the electronic device; and
   augmenting the image with a visible representation of at least some of the predetermined amount of audio input.

2. The method of claim 1, wherein the capturing the at least the image comprises capturing only a single still image.

3. The method of claim 1, wherein the capturing the at least the image comprises capturing a plurality of still images.

4. The method of claim 1, wherein the capturing the at least the image comprises capturing a predetermined duration of video input.

5. The method of claim 1, further comprising:
   identifying, with one or more sensors of the electronic device, one or more subjects in the at least the image; and
   further augmenting the image with another visible representation of an identity of the one or more subjects in the image.

6. The method of claim 1, further comprising:
   identifying, with one or more sensors of the electronic device, a mood of one or more subjects in the at least the image; and
   further augmenting the image with another visible representation of the mood of the one or more subjects in the image.

7. The method of claim 6, wherein the visible representation comprises an emoji.

8. The method of claim 1, wherein the visible representation comprises a depiction of a transcription of at least some of the predetermined amount of audio input.

9. The method of claim 1, further comprising creating, with one or more processors of the electronic device, one or more contractions from at least some of the predetermined amount of audio input, wherein the visible representation comprises a depiction of the one or more contractions.

10. The method of claim 1, further comprising:
    identifying, with one or more sensors of the electronic device, one or more contextual cues from the environment of the electronic device; and
    further augmenting the image with another visible representation of the one or more contextual cues.

11. The method of claim 10, wherein the one or more contextual cues comprise a volume of speech emitted by one or more subjects in the at least the image.

12. The method of claim 10, wherein the one or more contextual cues comprise music playing in the environment of the electronic device, wherein the another visible representation comprises an identifier of the music.

13. The method of claim 1, further comprising:
    identifying, with one or more sensors of the electronic device, a behavior of one or more subjects in the at least the image; and
    further augmenting the image with another visible representation of the behavior of the one or more subjects in the image.

14. The method of claim 13, wherein the behavior comprises one of laughter or crying.

15. An electronic device, comprising:
    a user interface receiving a single command to capture an image;
    an imager capturing at least the image in response to the single command to capture the image;
    one or more sensors determining contextual input from an environment of the electronic device while the imager captures the at least the image; and
    one or more processors augmenting the image with a visible representation of the contextual input to create a single augmented image;
    the contextual input comprising an identity of one or more subjects of an image.

16. The electronic device of claim 15, the visible representation comprising one or more banner labels superimposed upon depictions of the one or more subjects of the image, with each banner label comprising a name of a subject depicted in the image.

17. The electronic device of claim 15, the contextual input further comprising audio input, the visible representation comprising one or more of a contraction derived from the audio input, an identifier of music in the audio input, an identifier of a volume of the audio input, or jargon derived from the audio input.

18. A method in an electronic device, comprising:
    anticipating, with one or more processors of the electronic device, receipt of a single command to capture an image;
    prior to receiving the single command to capture the image, initiating, with an audio input device, receipt of audio input from an environment of the electronic device;
    receiving, with a user interface of the electronic device, the single command to capture the image;
    thereafter ceasing, with the audio input device, receipt of the audio input from the environment of the electronic device; and
    augmenting, with the one or more processors, the image with a visible representation of the audio input to create a single augmented image.

19. The method of claim 18, the anticipating comprising concurrently detecting, with the user interface, actuation of an imager of the electronic device and, with one or more motion sensors, stability of the electronic device.

20. The method of claim 18, the anticipating comprising detecting, with a proximity sensor of the electronic device, an object approaching a user interface control of the user interface.

\* \* \* \* \*